United States Patent [19]
Cheng et al.

[11] Patent Number: 5,941,217
[45] Date of Patent: Aug. 24, 1999

[54] METHOD OF COMPENSATING FOR CHANGING FUELS IN A FLEXIBLE FUELED VEHICLE USING A FUEL COMPOSITION SENSOR

[75] Inventors: Yi Cheng, Jackson; Shean P. Huff, Ann Arbor; Dennis A. Krozek, Novi; Gary L. Seitz, Chelsea, all of Mich.

[73] Assignee: Chrysler Corporation, Auburn Hills, Mich.

[21] Appl. No.: 08/959,819

[22] Filed: Oct. 29, 1997

[51] Int. Cl.[6] ............................................. F02D 41/04
[52] U.S. Cl. ........................ 123/494; 123/1 A; 123/575
[58] Field of Search ............................ 123/1 A, 478, 123/494, 575

[56] References Cited

U.S. PATENT DOCUMENTS

| | | | |
|---|---|---|---|
| 4,909,225 | 3/1990 | Gonze et al. | 123/1 A |
| 5,255,661 | 10/1993 | Nankee, II et al. | 123/674 |
| 5,267,163 | 11/1993 | Yoshida et al. | 123/494 X |
| 5,335,637 | 8/1994 | Davis et al. | 123/478 |
| 5,365,917 | 11/1994 | Adams et al. | 123/491 |
| 5,400,762 | 3/1995 | Fodale et al. | 123/674 |
| 5,415,145 | 5/1995 | Letcher et al. | 123/491 |
| 5,435,285 | 7/1995 | Adams et al. | 123/492 |
| 5,467,755 | 11/1995 | Konrad et al. | 123/674 |
| 5,497,753 | 3/1996 | Kopera | 123/494 |
| 5,520,162 | 5/1996 | Rotramel et al. | 123/689 |

*Primary Examiner*—Tony M. Argenbright
*Attorney, Agent, or Firm*—Mark P. Calcaterra

[57] ABSTRACT

The present invention provides a method of compensating for changing fuels in a flexible fueled vehicle using a fuel composition sensor. The methodology detects and models an alcohol concentration transition at fuel injector tips following a fuel addition. The methodology improves the accuracy of engine fueling during an alcohol concentration change by delaying the application of a fuel composition multiplier until the fuel analyzed by the fuel composition sensor actually reaches the injectors.

8 Claims, 1 Drawing Sheet

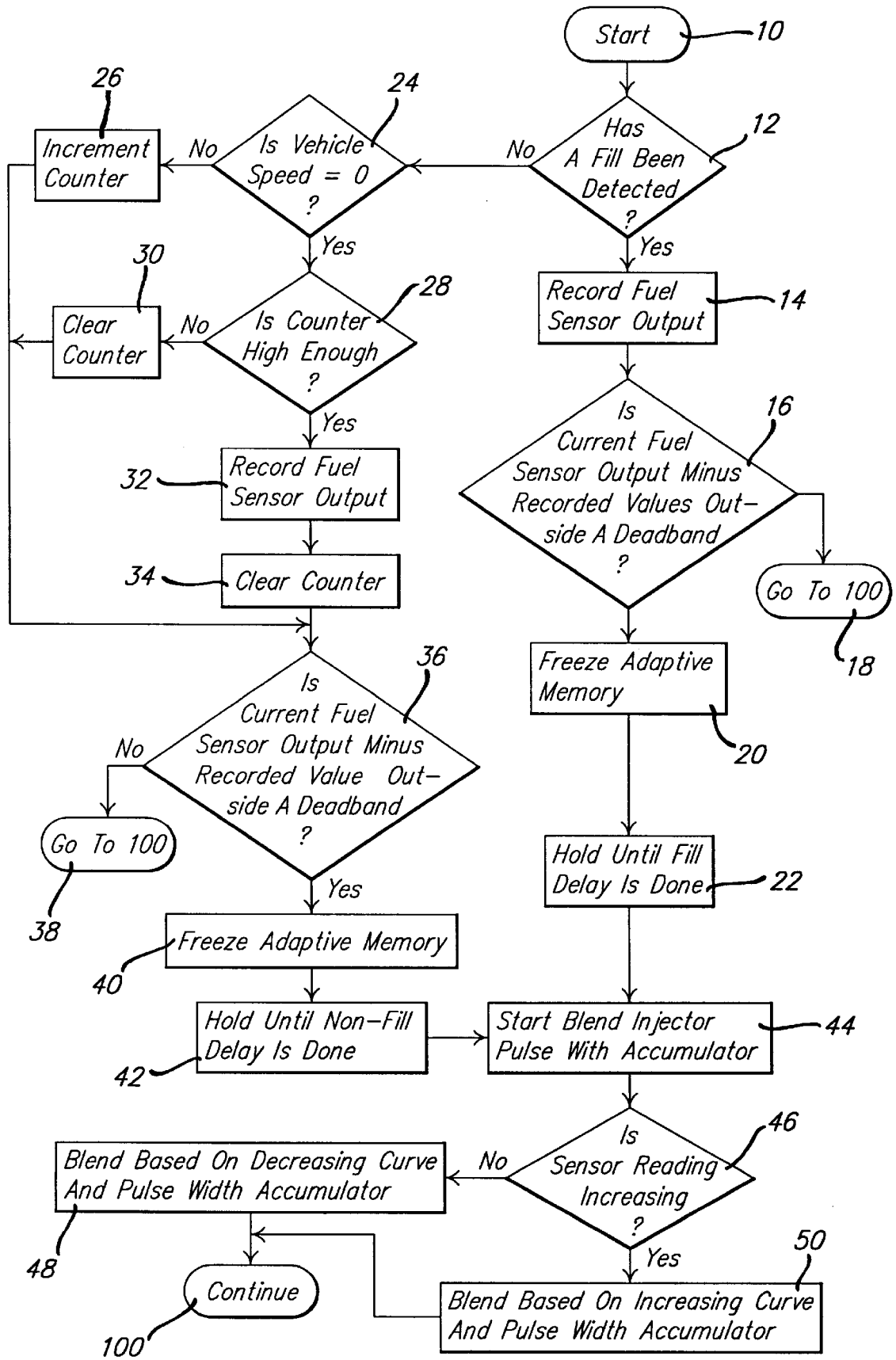

METHOD OF COMPENSATING FOR CHANGING FUELS IN A FLEXIBLE FUELED VEHICLE USING A FUEL COMPOSITION SENSOR

BACKGROUND OF THE INVENTION

1. Technical Field

The present invention relates generally to fuel control systems and, more particularly, to a method of controlling combustion parameters of an internal combustion engine in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

For example, U.S. Pat. No. 5,119,671, entitled "Method for Flexible Fuel Control", hereby expressly incorporated by reference, discloses a fuel composition sensor that measures the percent alcohol content of the fuel and relays that information to an engine controller or the like so that dependent variables such as spark timing and air/fuel ratio can be adjusted accordingly.

If a fuel composition sensor is used to directly measure the alcohol concentration in the fuel, it is mounted in the fuel line upstream of the injectors. The output of the sensor corresponds to a fuel composition multiplier that modifies the engine fueling to account for the fuel/air requirement differences of the fuels. Because there is a transport delay between the time the fuel is read by the sensor and the time the fuel reaches the injectors, the sensor reading does not correspond to the fuel at the injectors until after a period of time elapses.

Previously, there was no way to determine when the alcohol concentration was changing or any way to modify the output of the fuel composition sensor to match the actual fuel blending at the injectors. Therefore, the value read by the sensor was directly applied to the engine fueling. This causes fueling errors based on the difference between the fuel composition read by the sensor and the fuel composition being injected into the engine.

Therefore, it would be desirable to delay the application of the fuel composition multiplier that corresponds to the sensor reading until the fuel composition read by the sensor reaches the injectors. It would also be desirable to filter the sensor output to match the actual fuel delivery which may be affected by the fuel mixing in the fuel lines and the design of the fuel rail and injectors.

SUMMARY OF THE INVENTION

It is, therefore, one object of the present invention to provide a system of flexible fuel compensation.

It is another object of the present invention to provide a flexible fuel compensation system which detects when an alcohol concentration change is occurring.

It is yet another object of the present invention to provide a flexible fuel compensation system that delays application of a fuel composition multiplier read by the fuel composition sensor until the analyzed fuel actually reaches the engine.

It is still another object of the present invention to provide a flexible fuel compensation system that filters the applied fuel composition multiplier such that it models the actual fuel blending at the fuel injectors.

The above and other objects are provided by a method of compensating for changing fuels in a flexible fueled vehicle using a fuel composition sensor. By monitoring the fuel composition sensor's output for significant changes, the methodology determines when the alcohol concentration is changing. Also, by delaying and filtering the application of the sensor's output to engine fueling, the methodology models the actual change in the fuel being delivered to the engine.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart of a method of flexible fuel compensation control for a flexible fueled vehicle using a fuel composition sensor.

DETAILED DESCRIPTION OF THE PREFERRED EMBODIMENT

The present invention is directed towards a method of compensating for changing fuels in a flexible fueled vehicle using a fuel composition sensor. The methodology detects and models the alcohol concentration transition at the fuel injectors following a fuel addition. The methodology improves the accuracy of the engine fueling during an alcohol concentration change by delaying the application of a fuel composition multiplier until the fuel analyzed by the fuel composition sensor actually reaches the injectors.

When the fuel composition in a flexible fueled vehicle is being determined by a stand alone sensor such as a fuel composition sensor, a returnless type fuel system still presents some challenges for setting correct fueling parameters. The fuel composition sensor is mounted in a fuel line system upstream of the engine and fuel injectors. Therefore, there is a delay from the time when the fuel composition sensor reads a composition of the fuel in the fuel line system and the time when that fuel (i.e., the fuel read by the sensor) is delivered to the engine through the fuel injectors.

Also, a certain amount of fuel blending occurs in the fuel lines downstream of the fuel sensor and in the fuel rail. Because of the lag time and additional mixing, fueling errors may be induced if the fuel composition read by the sensor is used to determine the fuel for the engine.

In accordance with the present invention, the output of the fuel composition sensor is continuously monitored. If the output varies in the direction of increasing or decreasing alcohol content beyond given thresholds, the methodology assumes that the alcohol content in the fuel has been changed by an undetected fuel addition. On the other hand, if a fueling event is detected, smaller thresholds are used when monitoring changes in the fuel composition sensor output until a sufficient pulse width accumulation occurs to rule out a change in the fuel composition.

In accordance with the present invention, when a fuel composition change is detected, a pulse width accumulation delay is accounted for before the fueling parameters for the engine are changed for the alcohol content. The fuel composition sensor is mounted far enough upstream of the engine so that when the pulse width accumulation delay has expired, the fuel composition read by the sensor is approximately that of the new fully blended fuel. Therefore, using the alcohol content of the previous mix in the tank (i.e., old fuel) and the alcohol content of the current mix in the tank (i.e., new fuel), a blending curve is calculated representative of how the fuel will be blended in the engine versus the pulse width accumulation. This curve is employed for setting engine combustion parameters which are used until the fuel blending is complete. Thereafter, the actual output of the fuel composition sensor is used until the next substantial change in fuel composition is detected.

Turning now to the drawing FIGURE, FIG. 1 illustrates a flow chart for a method of flexible fuel compensation control using a fuel composition sensor. The methodology starts in bubble 10 and advances to decision block 12. In decision block 12, the methodology determines if a fuel fill has been detected. If so, the methodology advances to block 14.

In block 14, the methodology records the output of the fuel composition sensor. From block 14, the methodology advances to decision block 16. In decision block 16, the methodology determines if the current fuel sensor output minus a previously recorded fuel composition sensor output is outside of a deadband voltage of a preselected range. If not, the methodology advances to bubble 18 where it is forwarded to bubble 100 and returned to start-up bubble 10.

If the difference between the current fuel sensor output and the recorded sensor output is outside of the deadband voltage at decision block 16, the methodology advances to block 20. In block 20, the methodology freezes a long term adaptive fuel memory value of the control system to prevent errors in the blending model from influencing the long term fuel adaptive memory. From block 20, the methodology advances to block 22 and waits until a fill delay is complete.

Referring again to decision block 12, if no fill has been detected, the methodology advances to decision block 24. In decision block 24, the methodology determines if the vehicle has come to a stop. If not, the methodology advances to block 26 and increments a counter.

If the vehicle has come to a stop in decision block 24, the methodology advances to decision block 28. In decision block 28, the methodology determines if the counter has surpassed a preselected value. If not, the methodology advances to block 30 and clears the counter.

If the counter has incremented high enough at decision block 28, the methodology advances to block 32 and records the output of the fuel composition sensor. After recording the fuel sensor output at block 32, the methodology advances to block 34 and clears the counter. After clearing the counter at block 34 or 30, or incrementing the counter at block 26, the methodology advances to decision block 36. In decision block 36, the methodology determines if the difference between the current fuel sensor output value and a previously recorded sensor output value is outside of a deadband voltage of a preselected range. If not, the methodology advances to bubble 38 where it is forwarded to bubble 100 and returned to start-up bubble 10. However, if the difference between the current fuel sensor output value and the previously recorded sensor output value is outside of the deadband voltage, the methodology advances to block 40.

In block 40, the methodology freezes the adaptive long term fuel adaptive memory. From block 40, the methodology advances to block 42 where it waits until a non-fill delay elapses. After the non-fill delay period elapses at block 42, or after the fill delay elapses at block 22, the methodology advances to block 44.

In block 44, the methodology starts a fuel blend injector pulse width accumulator. From block 44, the methodology advances to decision block 46 and determines if the fuel composition sensor output is increasing. If not, the methodology advances to block 48. In block 48, the methodology employs a fuel blending strategy based on a decreasing fueling curve and the pulse width accumulator.

If the sensor output is increasing at decision block 46, the methodology advances to block 50 and implements a fuel blending strategy based on an increasing fueling curve and the pulse width accumulator. After implementing the appropriate fuel blending strategy at block 50 or 48, the methodology advances to bubble 100 where it is returned to start-up bubble 10.

Thus, the present invention provides a method of compensating for changing fuels in a flexible fueled vehicle using a fuel composition sensor. The methodology detects and models an alcohol concentration transition at the fuel injectors following a fuel addition. The methodology improves the accuracy of engine fueling during an alcohol concentration change by delaying the application of a fuel composition multiplier until the fuel analyzed by the fuel composition sensor actually reaches the injectors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine in a flexible fueled vehicle using a fuel composition sensor comprising:

monitoring an output of said fuel composition sensor;

detecting a change in percent alcohol content of fuel being delivered to said internal combustion engine by noting a change of said output beyond preselected thresholds;

calculating a fuel blending curve based on a first percent alcohol content of a previous fuel composition passing said sensor and a second percent alcohol content of a current fuel composition passing said sensor; and setting a fuel composition multiplier to affect said percent alcohol content delivered to said internal combustion engine according to said blending curve until a fuel blending period is complete.

2. The method of claim 1 wherein said predetermined time period corresponds to a time span required for fuel to travel from said fuel composition sensor to fuel injectors of said internal combustion engine.

3. The method of claim 1 further comprising returning control of said combustion parameters to a fuel control system based on said current output of said fuel composition sensor after said fuel blending period is complete.

4. The method of claim 1 further comprising filtering said fuel composition multiplier associated with said percent alcohol content such that said fuel composition multiplier models an actual fuel composition at fuel injectors of said internal combustion engine.

5. A method of controlling combustion parameters of an internal combustion engine in a flexible fueled vehicle using a fuel composition sensor comprising:

monitoring an output of said fuel composition sensor;

detecting a change in percent alcohol content of fuel being delivered to said internal combustion engine by noting a change of said output beyond preselected thresholds;

changing a fuel composition multiplier to affect said percent alcohol content delivered to said internal combustion engine after a predetermined time period; and filtering said fuel composition multiplier such that said fuel composition multiplier models an actual fuel composition at fuel injectors of said internal combustion engine.

6. The method of claim 5 wherein said predetermined time period corresponds to a time span required for fuel to travel from said fuel composition sensor to fuel injectors of said internal combustion engine.

7. The method of claim 5 further comprising:

calculating a fuel blending curve based on a first percent alcohol content of a previous fuel composition passing said sensor and a second percent alcohol content of a current fuel composition passing said sensor; and setting said fuel composition multiplier for controlling said combustion parameters according to said blending curve until a fuel blending period is complete.

8. The method of claim 7 further comprising returning control of said combustion parameters to a system based on said current output of said fuel composition sensor after said fuel blending period is complete.

* * * * *